United States Patent
Lee et al.

(10) Patent No.: US 12,040,905 B2
(45) Date of Patent: Jul. 16, 2024

(54) DETERMINATION OF MAXIMUM NUMBER OF UPLINK RETRANSMISSIONS

(71) Applicant: LG Electronics Inc., Seoul (KR)

(72) Inventors: Youngdae Lee, Seoul (KR); Sunyoung Lee, Seoul (KR); Heejeong Cho, Seoul (KR); Eunjong Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 404 days.

(21) Appl. No.: 17/417,936

(22) PCT Filed: Jan. 30, 2020

(86) PCT No.: PCT/KR2020/001438
§ 371 (c)(1),
(2) Date: Jun. 24, 2021

(87) PCT Pub. No.: WO2020/159261
PCT Pub. Date: Aug. 6, 2020

(65) Prior Publication Data
US 2022/0060292 A1 Feb. 24, 2022

(30) Foreign Application Priority Data
Jan. 30, 2019 (KR) .................. 10-2019-0012248

(51) Int. Cl.
*H04L 1/1867* (2023.01)
*H04W 28/02* (2009.01)
(Continued)

(52) U.S. Cl.
CPC ....... *H04L 1/1883* (2013.01); *H04W 28/0278* (2013.01); *H04W 72/21* (2023.01);
(Continued)

(58) Field of Classification Search
CPC . H04W 72/04; H04W 72/21; H04W 36/0055; H04W 28/0278; H04W 72/56;
(Continued)

(56) References Cited

U.S. PATENT DOCUMENTS

2010/0150085 A1 6/2010 Ishii et al.
2011/0134829 A1 6/2011 Chen et al.
(Continued)

FOREIGN PATENT DOCUMENTS

WO WO2017104981 6/2017

OTHER PUBLICATIONS

3rd Generation Partnership Project; Technical Specification Group Radio Access Network, "NR; Medium Access Control (MAC) protocol specification (Release 15)," 3GPP TS 38.321, V15.4.0, dated Dec. 2018, 77 pages.

*Primary Examiner* — Nam T Huynh
(74) *Attorney, Agent, or Firm* — Fish & Richardson P.C.

(57) ABSTRACT

A method and apparatus for determination of a maximum number of uplink retransmissions in a wireless communication system is provided. A wireless device receives, from a network, information related to a first retransmission number for a first logical channel and second retransmission number for a second logical channel, determines a retransmission number of a data unit among the first retransmission number and the second retransmission number, and transmits, to the network, information for the retransmission number of the data unit.

9 Claims, 14 Drawing Sheets

(51) Int. Cl.
*H04W 72/21* (2023.01)
*H04W 72/23* (2023.01)
*H04L 1/1812* (2023.01)
*H04W 74/00* (2009.01)

(52) U.S. Cl.
CPC .......... *H04W 72/23* (2023.01); *H04L 1/1812* (2013.01); *H04W 74/004* (2013.01)

(58) Field of Classification Search
CPC . H04L 1/18; H04L 1/08; H04L 1/1812; H04L 1/1822; H04L 1/1883; H04L 1/1848; H04L 1/1854; H04L 1/1864
See application file for complete search history.

(56) References Cited

U.S. PATENT DOCUMENTS

| | | |
|---|---|---|
| 2015/0009936 A1 | 1/2015 | Quan et al. |
| 2018/0048498 A1 | 2/2018 | Stern-Berkowitz et al. |
| 2019/0387578 A1* | 12/2019 | Shrestha ............... H04W 72/21 |
| 2021/0195466 A1* | 6/2021 | Baek ................. H04W 28/0268 |

* cited by examiner

DETERMINATION OF MAXIMUM NUMBER OF UPLINK RETRANSMISSIONS

CROSS-REFERENCE TO RELATED APPLICATIONS

This application is a National Stage application under 35 U.S.C. § 371 of International Application No. PCT/KR2020/001438, filed on Jan. 30, 2020, which claims the benefit of Korean Patent Application No. 10-2019-0012248, filed on Jan. 30, 2019. The disclosures of the prior applications are incorporated by reference in their entirety.

TECHNICAL FIELD

The present disclosure relates to determination of a maximum number of uplink retransmissions.

BACKGROUND 5G new radio (NR) is a new radio access technology (RAT) developed by 3rd generation partnership project (3GPP) for the 5G (fifth generation) mobile network. It was designed to be the global standard for the air interface of 5G networks. The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Automatic repeat request (ARQ) is an error-control method for data transmission that uses acknowledgements (messages sent by the receiving side indicating that it has correctly received a packet) and timeouts (specified periods of time allowed to elapse before an acknowledgment is to be received) to achieve reliable data transmission over an unreliable service. If the transmitting side does not receive an acknowledgment before the timeout, it usually re-transmits the packet until the transmitting side receives an acknowledgment or exceeds a predefined number of retransmissions.

SUMMARY

Multiple packets from multiple logical channels for different services can be multiplexed into one single data unit. In this case, each of multiple packets from multiple logical channels for different services may have different requirements. Therefore, retransmission number for each of multiple packets from multiple logical channels for different services may need to be configured differently.

In an aspect, a method for a wireless device in a wireless communication system is provided. The method includes receiving, from a network, information related to a first retransmission number for a first logical channel and second retransmission number for a second logical channel, determining a retransmission number of a data unit among the first retransmission number and the second retransmission number, and transmitting, to the network, information for the retransmission number of the data unit.

In another aspect, an apparatus for implementing the above method is provided.

The present disclosure can have various advantageous effects.

A wireless device performing uplink HARQ transmission of a packet by using radio resources can dynamically and efficiently allocate resources for retransmissions of the packet by considering service characteristics and/or requirements, in particular when packets from various services are multiplexed into a single data unit.

The system can provide dynamic and efficient allocation of resources for data retransmissions for a wireless device performing uplink HARQ transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Figure 1:
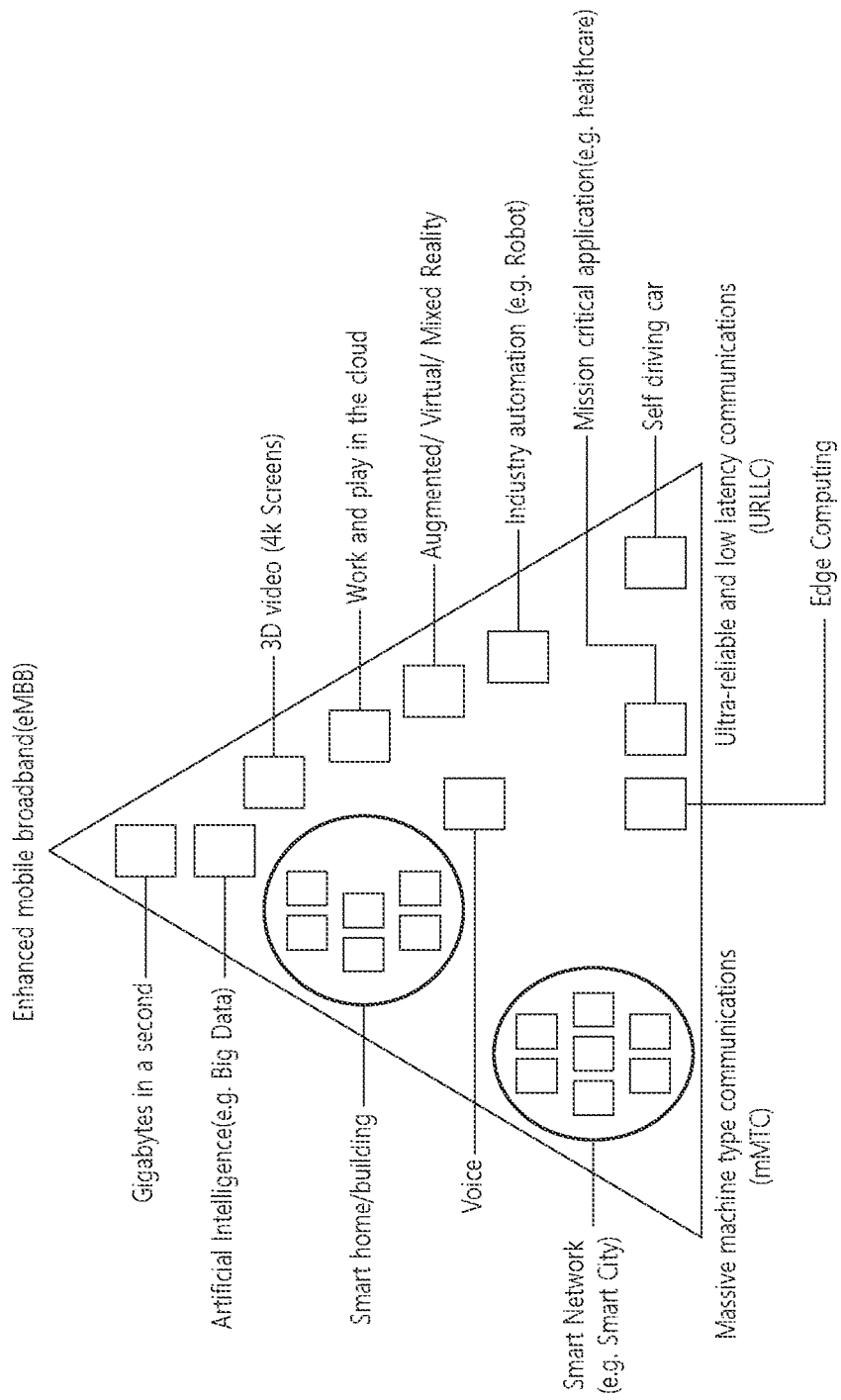
FIG. 1 shows examples of 5G usage scenarios to which the technical features of the present disclosure can be applied.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
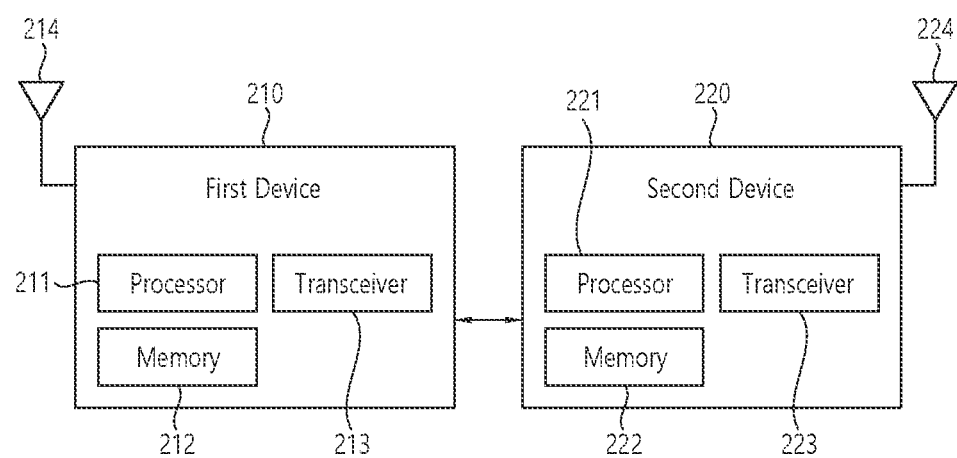
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
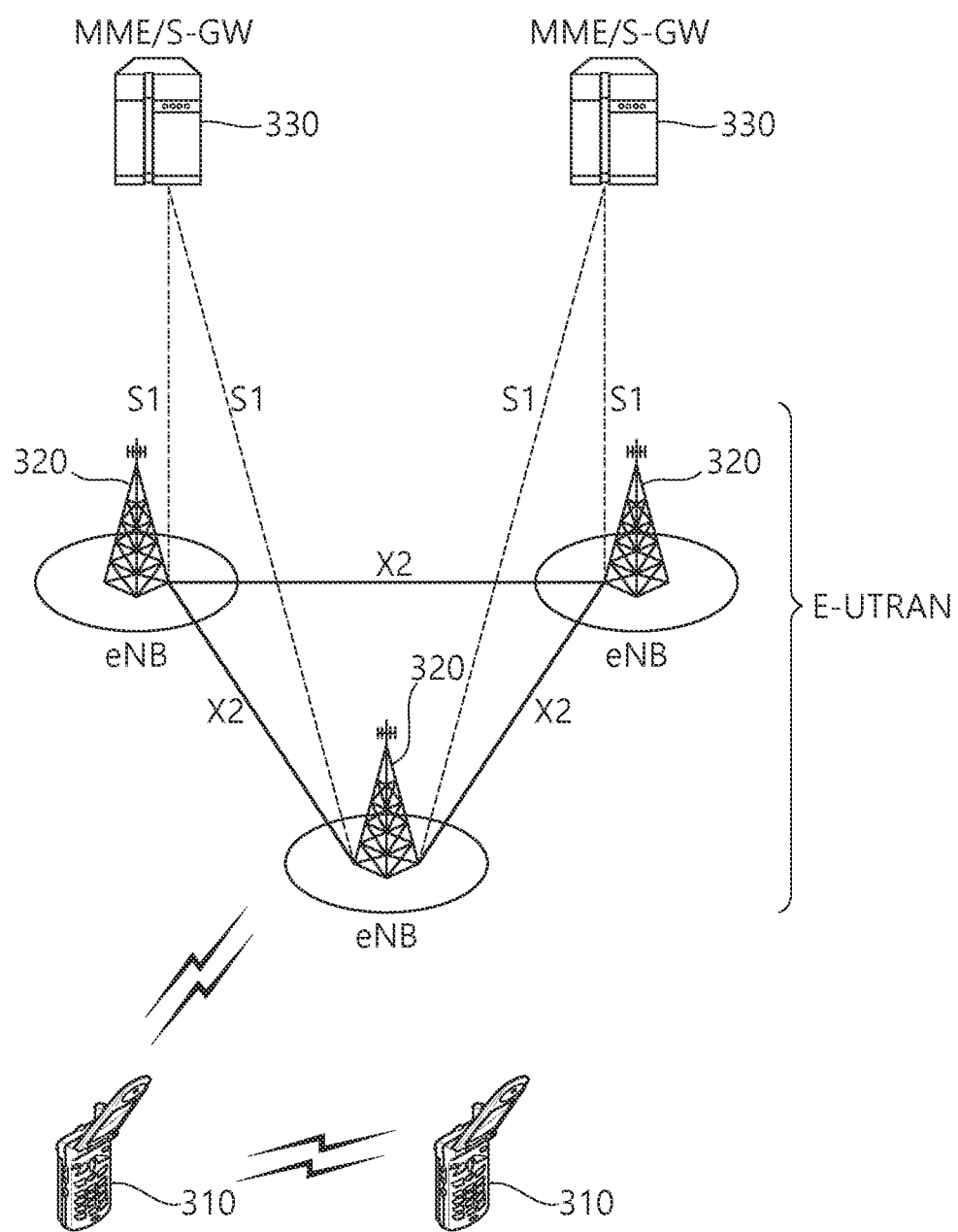
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
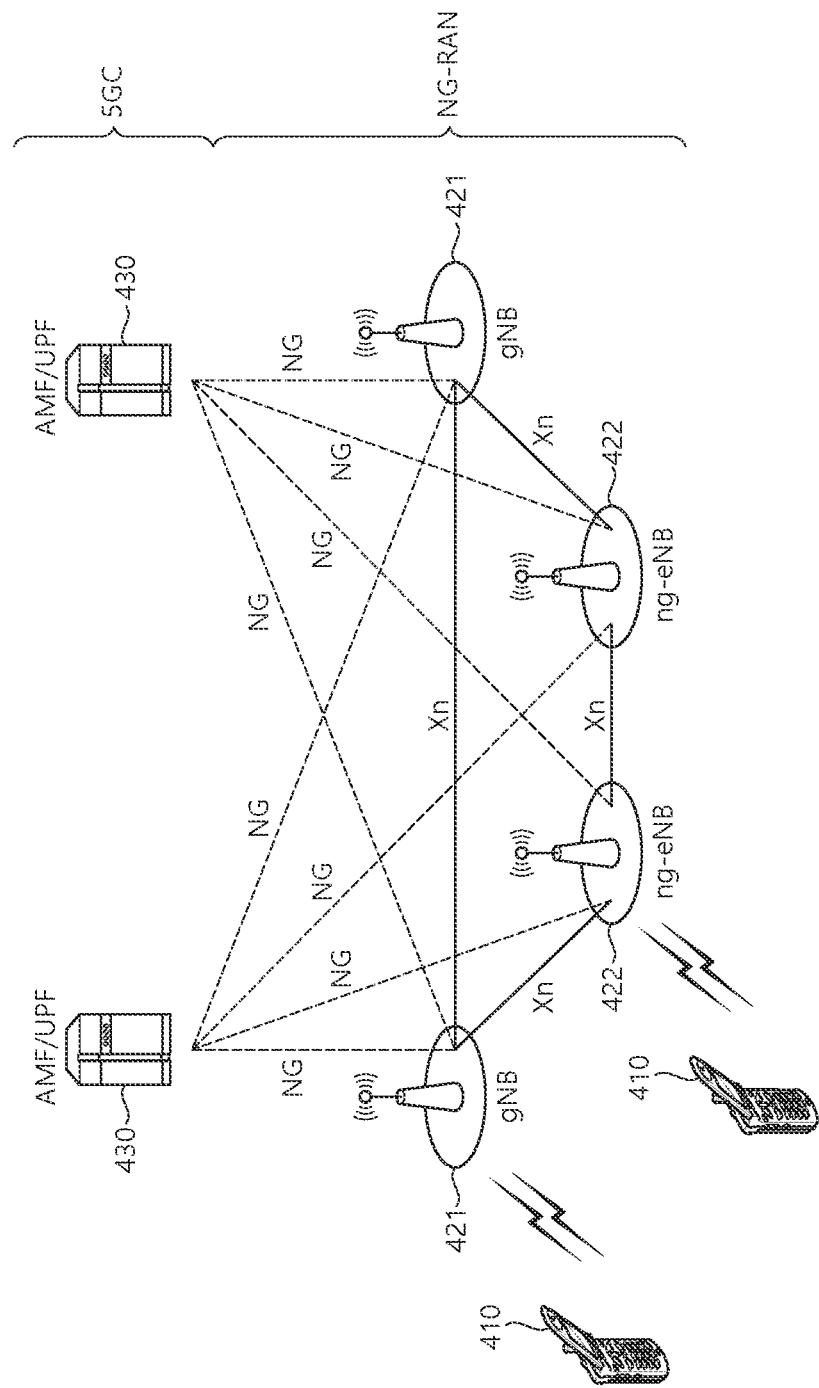
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g., eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g., NG-RAN and/or E-UTRAN) may be classified into a first layer (L1), a second layer (L2), and a third layer (L3) based on the lower three layers of the open system interconnection (OSI) model that is well-known in the communication system.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz - 6000 MHz | 15, 30, 60 kHz |
| FR2 | 24250 MHz - 52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz - 7125 MHz | 15, 30, 60 kHz |
| FR2 | 24250 MHz - 52600 MHz | 60, 120, 240 kHz |

Figure 5:
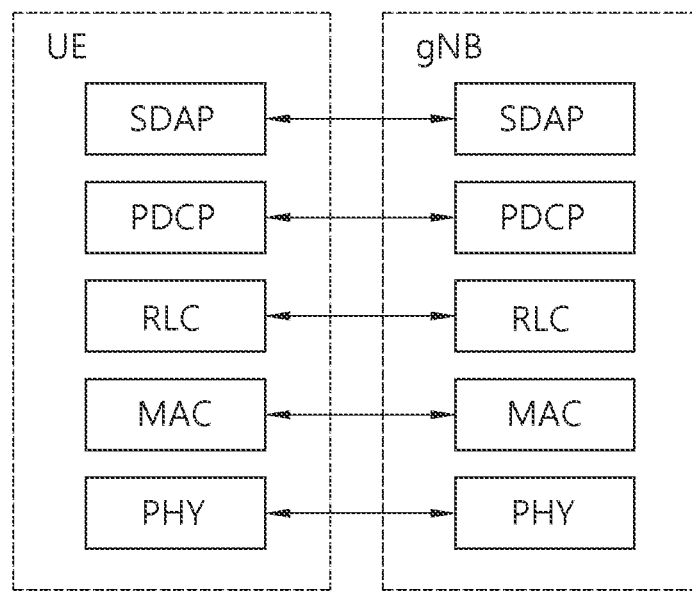
FIG. 5 shows a block diagram of a user plane protocol stack to which the technical features of the present disclosure can be applied.
Figure 6:
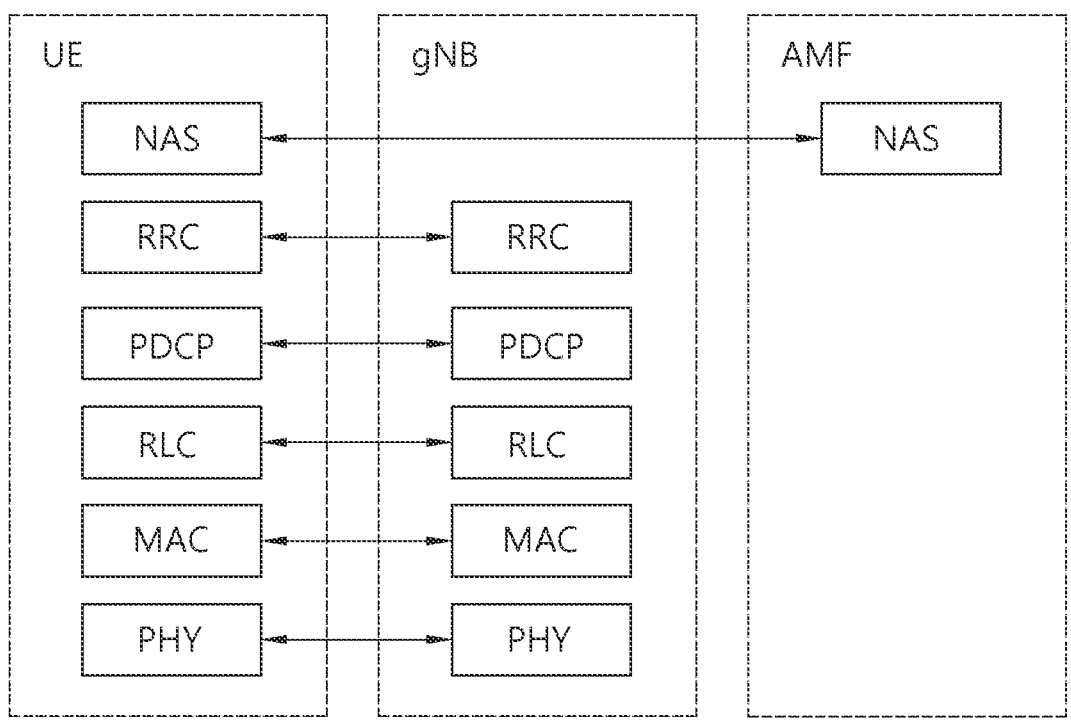
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

Figure 7:
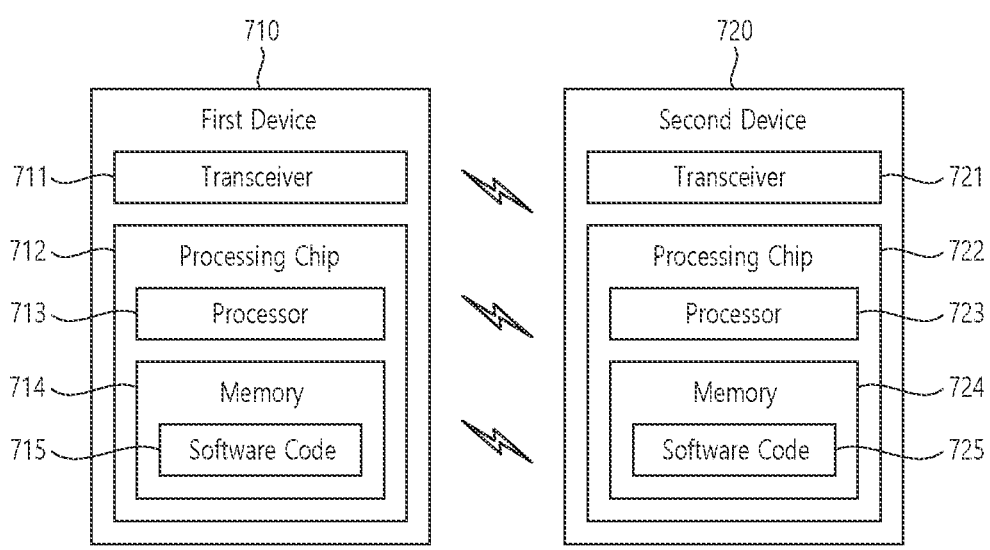
FIG. 7 shows another example of a wireless communication system to which the technical features of the present disclosure can be applied.

FIG. 7 shows another example of a wireless communication system to which the technical features of the present disclosure can be applied.

Referring to FIG. 7, wireless devices 710 and 720 may correspond to the wireless devices 210 and 220 of FIG. 2 and may be configured by various elements, components, units/portions, and/or modules.

The first wireless device 710 may include at least one transceiver, such as a transceiver 711, and at least one processing chip, such as a processing chip 712. The processing chip 712 may include at least one processor, such a processor 713, and at least one memory, such as a memory 714. The memory 714 may be operably connectable to the processor 713. The memory 714 may store various types of information and/or instructions. The memory 714 may store a software code 715 which implements instructions that, when executed by the processor 713, perform the descriptions, functions, procedures, suggestions, methods and/or operational flowcharts disclosed in the present disclosure. For example, the software code 715 may implement instructions that, when executed by the processor 713, perform the descriptions, functions, procedures, suggestions, methods and/or operational flowcharts disclosed in the present disclosure. For example, the software code 715 may control the processor 713 to perform one or more protocols. For example, the software code 715 may control the processor 713 may perform one or more layers of the radio interface protocol.

The second wireless device 720 may include at least one transceiver, such as a transceiver 721, and at least one processing chip, such as a processing chip 722. The processing chip 722 may include at least one processor, such a processor 723, and at least one memory, such as a memory 724. The memory 724 may be operably connectable to the processor 723. The memory 724 may store various types of information and/or instructions. The memory 724 may store a software code 725 which implements instructions that, when executed by the processor 723, perform the descriptions, functions, procedures, suggestions, methods and/or operational flowcharts disclosed in the present disclosure. For example, the software code 725 may implement instructions that, when executed by the processor 723, perform the descriptions, functions, procedures, suggestions, methods and/or operational flowcharts disclosed in the present disclosure. For example, the software code 725 may control the processor 723 to perform one or more protocols. For example, the software code 725 may control the processor 723 may perform one or more layers of the radio interface protocol.

Figure 8:
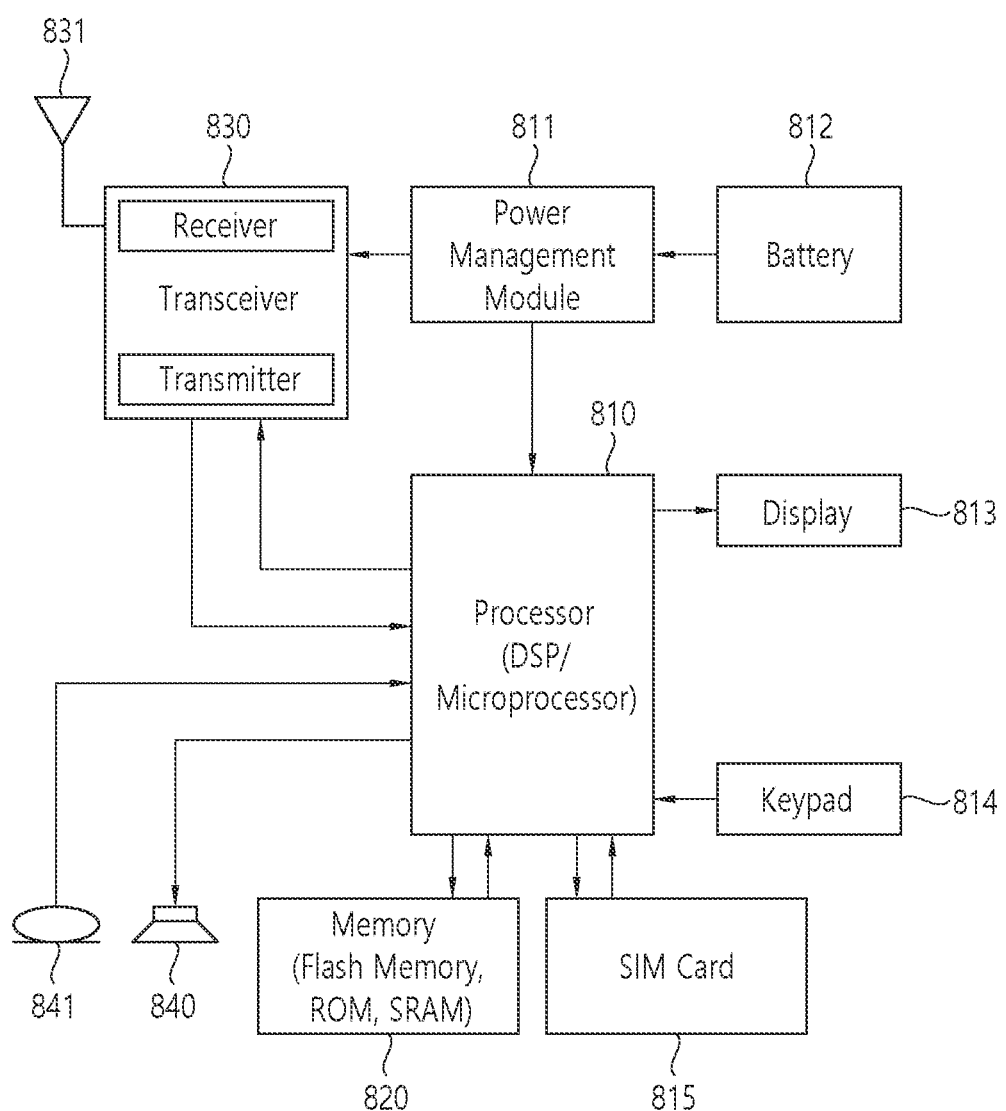
FIG. 8 shows a UE to which the technical features of the present disclosure can be applied.

FIG. 8 shows an example of UE to which the technical features of the present disclosure can be applied.

A UE includes a processor 810, a power management module 811, a battery 812, a display 813, a keypad 814, a subscriber identification module (SIM) card 815, a memory 820, a transceiver 830, one or more antennas 831, a speaker 840, and a microphone 841.

The processor 810 may be configured to implement the descriptions, functions, procedures, suggestions, methods and/or operational flowcharts disclosed in the present disclosure. The processor 810 may be configured to control one or more other components of the UE to implement the descriptions, functions, procedures, suggestions, methods and/or operational flowcharts disclosed in the present disclosure. Layers of the radio interface protocol may be implemented in the processor 810. The processor 810 may include ASIC, other chipset, logic circuit and/or data processing device. The processor 810 may be an application processor. The processor 810 may include at least one of a digital signal processor (DSP), a central processing unit (CPU), a graphics processing unit (GPU), a modem (modulator and demodulator). An example of the processor 810 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 811 manages power for the processor 810 and/or the transceiver 830. The battery 812 supplies power to the power management module 811. The display 813 outputs results processed by the processor 810. The keypad 814 receives inputs to be used by the processor 810. The keypad 814 may be shown on the display 813. The SIM card 815 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 820 is operatively coupled with the processor 810 and stores a variety of information to operate the processor 810. The memory 820 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

The transceiver 830 is operatively coupled with the processor 810, and transmits and/or receives a radio signal. The transceiver 830 includes a transmitter and a receiver. The transceiver 830 may include baseband circuitry to process radio frequency signals. The transceiver 830 controls the one or more antennas 831 to transmit and/or receive a radio signal.

The speaker 840 outputs sound-related results processed by the processor 810. The microphone 841 receives sound-related inputs to be used by the processor 810.

HARQ operation and HARQ process is described. Section 5.4.2 of 3GPP TS 38.321 V15.4.0 (2018-12) can be referred.

The MAC entity includes a HARQ entity for each serving cell with configured uplink (including the case when it is configured with supplementaryUplink), which maintains a number of parallel HARQ processes.

Each HARQ process supports one TB.

Each HARQ process is associated with a HARQ process identifier. For UL transmission with UL grant in random access (RA) response, HARQ process identifier 0 is used.

When the MAC entity is configured with pusch-AggregationFactor >1, the parameter pusch-AggregationFactor provides the number of transmissions of a TB within a bundle of the dynamic grant. After the initial transmission, pusch-AggregationFactor−1 HARQ retransmissions follow within a bundle. When the MAC entity is configured with repK >1, the parameter repK provides the number of transmissions of a TB within a bundle of the configured uplink grant. After the initial transmission, HARQ retransmissions follow within a bundle. For both dynamic grant and configured uplink grant, bundling operation relies on the HARQ entity for invoking the same HARQ process for each transmission that is part of the same bundle. Within a bundle, HARQ retransmissions are triggered without waiting for feedback from previous transmission according to puschAggregationFactor for a dynamic grant and repK for a configured uplink grant, respectively. Each transmission within a bundle is a separate uplink grant after the initial uplink grant within a bundle is delivered to the HARQ entity.

For each uplink grant, the HARQ entity shall:
1> identify the HARQ process associated with this grant, and for each identified HARQ process:
2> if the received grant was not addressed to a temporary C-RNTI on PDCCH, and the new data indicator (NDI) provided in the associated HARQ information has been toggled compared to the value in the previous transmission of this TB of this HARQ process; or
2> if the uplink grant was received on PDCCH for the C-RNTI and the HARQ buffer of the identified process is empty; or
2> if the uplink grant was received in a random access response; or
2> if the uplink grant was received on PDCCH for the C-RNTI in ra-ResponseWindow and this PDCCH successfully completed the random access procedure initiated for beam failure recovery; or
2> if the uplink grant is part of a bundle of the configured uplink grant, and may be used for initial transmission, and if no MAC PDU has been obtained for this bundle:
3> if there is a MAC PDU in the Msg3 buffer and the uplink grant was received in a Random Access Response; or:
3> if there is a MAC PDU in the Msg3 buffer and the uplink grant was received on PDCCH for the C-RNTI in ra-ResponseWindow and this PDCCH successfully completed the Random Access procedure initiated for beam failure recovery:
4> obtain the MAC PDU to transmit from the Msg3 buffer.
4> if the uplink grant size does not match with size of the obtained MAC PDU; and
4> if the random access procedure was successfully completed upon receiving the uplink grant:
5> indicate to the multiplexing and assembly entity to include MAC subPDU(s) carrying MAC SDU from the obtained MAC PDU in the subsequent uplink transmission;
5> obtain the MAC PDU to transmit from the Multiplexing and assembly entity.
3> else:
4> obtain the MAC PDU to transmit from the Multiplexing and assembly entity, if any;
3> if a MAC PDU to transmit has been obtained:
4> deliver the MAC PDU and the uplink grant and the HARQ information of the TB to the identified HARQ process;
4> instruct the identified HARQ process to trigger a new transmission;
4> if the uplink grant is addressed to CS-RNTI; or
4> if the uplink grant is a configured uplink grant; or 4> if the uplink grant is addressed to C-RNTI, and the identified HARQ process is configured for a configured uplink grant:
5> start or restart the configuredGrantTimer, if configured, for the corresponding HARQ process when the transmission is performed.
3> else:
4> flush the HARQ buffer of the identified HARQ process.
2> else (i.e., retransmission):
3> if the uplink grant received on PDCCH was addressed to CS-RNTI and if the HARQ buffer of the identified process is empty; or
3> if the uplink grant is part of a bundle and if no MAC PDU has been obtained for this bundle; or
3> if the uplink grant is part of a bundle of the configured uplink grant, and the PUSCH of the uplink grant overlaps with a PUSCH of another uplink grant received on the PDCCH or in a random access response for this serving cell:
4> ignore the uplink grant.
3> else:
4> deliver the uplink grant and the HARQ information (redundancy version) of the TB to the identified HARQ process;
4> instruct the identified HARQ process to trigger a retransmission;
4> if the uplink grant is addressed to CS-RNTI; or
4> if the uplink grant is addressed to C-RNTI, and the identified HARQ process is configured for a configured uplink grant:
5> start or restart the configuredGrantTimer, if configured, for the corresponding HARQ process when the transmission is performed.

When determining if NDI has been toggled compared to the value in the previous transmission, the MAC entity shall ignore NDI received in all uplink grants on PDCCH for its Temporary C-RNTI.

Each HARQ process is associated with a HARQ buffer.

New transmissions are performed on the resource and with the MCS indicated on either PDCCH, random access response, or RRC. Retransmissions are performed on the resource and, if provided, with the MCS indicated on PDCCH, or on the same resource and with the same MCS as was used for last made transmission attempt within a bundle.

If the HARQ entity requests a new transmission for a TB, the HARQ process shall:
1> store the MAC PDU in the associated HARQ buffer;
1> store the uplink grant received from the HARQ entity;
1> generate a transmission as described below.

If the HARQ entity requests a retransmission for a TB, the HARQ process shall:
1> store the uplink grant received from the HARQ entity;
1> generate a transmission as described below.

To generate a transmission for a TB, the HARQ process shall:
1> if the MAC PDU was obtained from the Msg3 buffer; or
1> if there is no measurement gap at the time of the transmission and, in case of retransmission, the retransmission does not collide with a transmission for a MAC PDU obtained from the Msg3 buffer:
2> instruct the physical layer to generate a transmission according to the stored uplink grant.

Logical channel prioritization (LCP) is described. Section 5.4.3.1 of 3GPP TS 38.321 V15.4.0 (2018-12) can be referred.

The LCP procedure is applied whenever a new transmission is performed.

RRC controls the scheduling of uplink data by signaling for each logical channel per MAC entity:
priority where an increasing priority value indicates a lower priority level;
prioritisedBitRate which sets the prioritized bit rate (PBR);
bucketSizeDuration which sets the bucket size duration (BSD).

RRC additionally controls the LCP procedure by configuring mapping restrictions for each logical channel:
allowedSCS-List which sets the allowed Subcarrier Spacing(s) for transmission;
maxPUSCH-Duration which sets the maximum PUSCH duration allowed for transmission;
configuredGrantType1Allowed which sets whether a configured grant Type 1 can be used for transmission;
allowedServingCells which sets the allowed cell(s) for transmission.

The following UE variable is used for the Logical channel prioritization procedure:
Bj which is maintained for each logical channel j.

The MAC entity shall initialize Bj of the logical channel to zero when the logical channel is established.

For each logical channel j, the MAC entity shall:
1> increment Bj by the product PBR X T before every instance of the LCP procedure, where T is the time elapsed since Bj was last incremented;
1> if the value of Bj is greater than the bucket size (i.e. PBR X BSD):
2> set Bj to the bucket size.

The MAC entity shall, when a new transmission is performed:
1> select the logical channels for each UL grant that satisfy all the following conditions:
2> the set of allowed Subcarrier Spacing index values in allowedSCS-List, if configured, includes the Subcarrier Spacing index associated to the UL grant; and
2> maxPUSCH-Duration, if configured, is larger than or equal to the PUSCH transmission duration associated to the UL grant; and
2> configuredGrantType1Allowed, if configured, is set to true in case the UL grant is a Configured Grant Type 1; and
2> allowedServingCells, if configured, includes the Cell information associated to the UL grant. Does not apply to logical channels associated with a DRB configured with PDCP duplication within the same MAC entity (i.e., carrier aggregation (CA) duplication) for which PDCP duplication is deactivated.

The subcarrier spacing index, PUSCH transmission duration and cell information are included in uplink transmission information received from lower layers for the corresponding scheduled uplink transmission.

The MAC entity shall, when a new transmission is performed:
1> allocate resources to the logical channels as follows:
2> logical channels selected for the UL grant with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s);

2> decrement Bj by the total size of MAC SDUs served to logical channel j above;

2> if any resources remain, all the logical channels are served in a strict decreasing priority order (regardless of the value of Bj) until either the data for that logical channel or the UL grant is exhausted, whichever comes first. Logical channels configured with equal priority should be served equally.

The value of Bj can be negative.

The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources of the associated MAC entity;

if the UE segments an RLC SDU from the logical channel, it shall maximize the size of the segment to fill the grant of the associated MAC entity as much as possible;

the UE should maximize the transmission of data;

if the MAC entity is given a UL grant size that is equal to or larger than 8 bytes while having data available and allowed for transmission, the MAC entity shall not transmit only padding buffer status report (BSR) and/or padding.

The MAC entity shall not generate a MAC PDU for the HARQ entity if the following conditions are satisfied:

the MAC entity is configured with skipUplinkTxDynamic and the grant indicated to the HARQ entity was addressed to a C-RNTI, or the grant indicated to the HARQ entity is a configured uplink grant; and there is no aperiodic channel state information (CSI) requested for this PUSCH transmission; and the MAC PDU includes zero MAC SDUs; and the MAC PDU includes only the periodic BSR and there is no data available for any logical channel group (LCG), or the MAC PDU includes only the padding BSR.

Logical channels shall be prioritized in accordance with the following order (highest priority listed first):

C-RNTI MAC control element (CE) or data from UL-CCCH;

Configured grant confirmation MAC CE;

MAC CE for BSR, with exception of BSR included for padding;

Single entry power headroom reporting (PHR) MAC CE or multiple entry PHR MAC CE;

data from any logical channel, except data from UL-CCCH;

MAC CE for recommended bit rate query;

MAC CE for BSR included for padding.

As described above, multiple packets from multiple logical channels for different services can be multiplexed into one single MAC PDU to be transmitted. Then, HARQ entity may perform transmission and/or retransmissions of the MAC PDU.

In LTE/LTE-A, the maximum number of retransmissions may be configured to a wireless device by the network. The configured maximum number of retransmissions may be applied to all HARQ retransmissions regardless of what is contained in the MAC PDU. Thus, the wireless device cannot retransmit a certain MAC PDU up to more than the maximum number of retransmissions required for a service carried in the MAC PDU.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 9:
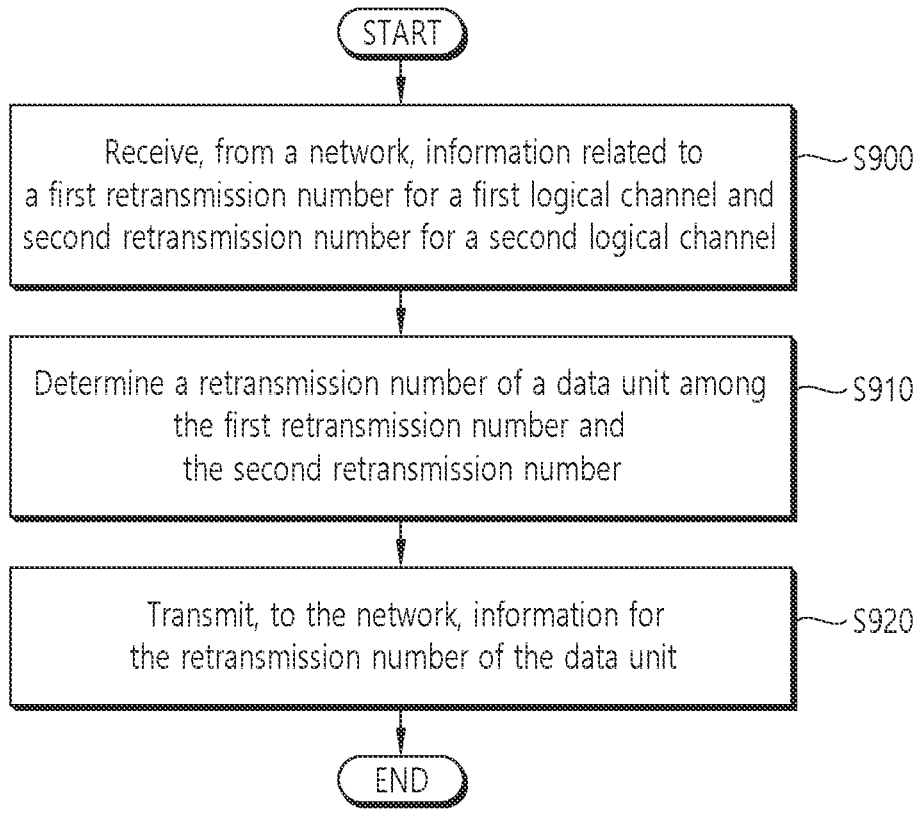
FIG. 9 shows an example of a method for a wireless device to which the technical features of the present disclosure can be applied.

FIG. 9 shows an example of a method for a wireless device to which the technical features of the present disclosure can be applied.

In step S900, the wireless device receives, from a network, information related to a first retransmission number for a first logical channel and second retransmission number for a second logical channel.

In some implementations, the first retransmission number may include a first maximum number of retransmissions for the first logical channel. The second retransmission number may include a second maximum number of retransmissions for the second logical channel.

In some implementations, the first logical channel may belong to a first logical channel group. The second logical channel may belong to a second logical channel group. That is, the first retransmission number may be configured for the first logical channel group including the first logical channel, and the second retransmission number may be configured for the second logical channel group including the second logical channel.

In step S910, the wireless device determines a retransmission number of a data unit among the first retransmission number and the second retransmission number.

In some implementations, the data unit may be constructed for the first logical channel and the second logical channel. The data unit may include a MAC PDU. The MAC PDU may include one or more MAC SDUs from the first logical channel and the second logical channel.

In some implementations, the data unit may be constructed based on a grant. The grant may include an uplink grant. The uplink grant may be autonomously created by the wireless device. Or, the uplink grant may be received from the network. The uplink grant may be mapped to at least one of the first logical channel and/or the second logical channel.

In some implementations, the retransmission number of the data unit may be a highest number among the first retransmission number and the second retransmission number.

In step S920, the wireless device transmits, to the network, information for the retransmission number of the data unit.

In some implementations, the wireless device may perform, to the network, transmission of the data unit based on the retransmission number of the data unit. In some implementations, the (re-)transmission of the data unit may be performed up to the retransmission number of the data unit based on not being positively acknowledged by the network. That is, when (re-)transmission of the MAC PDU is not positively acknowledged by the network, the wireless device may perform (re-)transmission of the data unit up to the retransmission number of the data unit. In some implementations, the (re-)transmission of the data unit may be performed up to the retransmission number of the data unit based on reception of a grant for a retransmission. That is, when a grant is received for a retransmission, the wireless device may perform (re-)transmission of the data unit up to the retransmission number of the data unit.

In some implementations, additionally and/or alternatively, information related to a first timer value for the first logical channel and a second timer value for the second logical channel may be received from the network. A retransmission timer value may be determined among the first timer value and the second timer value. The retransmission timer value may be a highest timer value among the first timer value and the second timer value. Information related to the retransmission timer value may be transmitted to the network.

In some implementations, a timer may start upon performing a new transmission of the data unit. In some implementations, the (re-)transmission of the data unit may be performed until the timer runs up to the retransmission timer value based on not being positively acknowledged by the network. That is, when (re-)transmission of the MAC PDU is not positively acknowledged by the network, the wireless device may perform (re-)transmission of the data unit until the timer runs up to the retransmission timer value. In some implementations, the (re-)transmission of the data unit may be performed until the timer runs up to the retransmission timer value based on reception of a grant for a retransmission. That is, when a grant is received for a retransmission, the wireless device may perform (re-)transmission of the data unit until the timer runs up to the retransmission timer value.

In some implementations, information related to at least one of a maximum number of grants for retransmission, how many retransmissions the wireless device wants to perform, and/or how long the wireless device UE wants to perform retransmissions for at least one of the first logical channel and/or the second logical channel may be transmitted to the network.

In some implementations, the first/second retransmission numbers for the first/second logical channels may be replaced by first/second retransmission numbers for e.g., first/second service types, first/second priorities, first/second QoS indicators and/or first/second destinations, respectively. For example, the first retransmission number may be configured for the first service type, and the second retransmission number may be configured for the second service type.

In some implementations, the first/second timer values for the first/second logical channels may be replaced by first/second timer values for e.g., first/second service types, first/second priorities, first/second QoS indicators and/or first/second destinations, respectively. For example, the first timer value may be configured for the first service type, and the second timer value may be configured for the second service type.

In some implementations, the priority may include at least one of a logical channel priority, proximity-based services (ProSe)-per-packet priority (PPPP) and/or ProSe-per-packet reliability (PPPR).

In some implementations, the QoS indicator may include at least one of a QoS class identifier (QCI) and/or 5G QoS indicator (5QI).

Figure 10:
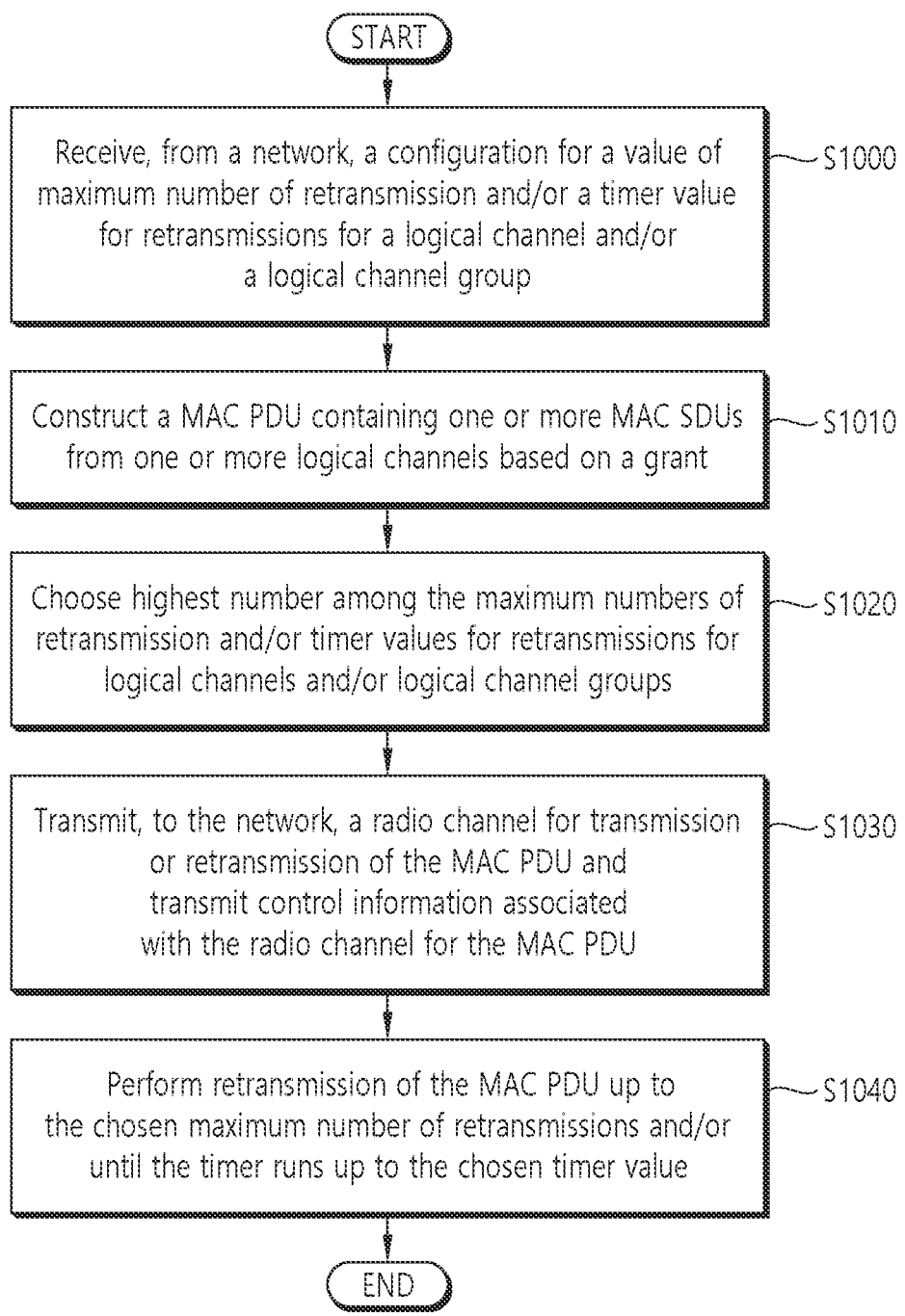
FIG. 10 shows an example of a method for performing data transmission by a wireless device to which the technical features of the present disclosure can be applied.

FIG. 10 shows an example of a method for performing data transmission by a wireless device to which the technical features of the present disclosure can be applied.

In step S1000, the wireless device receives, from a network, a configuration for a value of the maximum number of retransmissions and/or a timer value for retransmissions for a logical channel and/or logical channel group.

In some implementations, the network (e.g., base station, gNB, eNB, etc.) may configure the value of the maximum number of retransmissions and/or the timer value for retransmissions for each logical channel and/or each logical channel group to the wireless device.

In some implementations, different logical channels may be configured with different values. For example, a first maximum number of retransmissions may be configured for a first logical channel and/or a first logical channel group, and a second maximum number of retransmissions may be configured for a second logical channel and/or a second logical channel group. For example, a first timer value for retransmissions may be configured for a first logical channel and/or a first logical channel group, and a second timer value for retransmissions may be configured for a second logical channel and/or a second logical channel group.

In step S1010, if a grant is available, the wireless device constructs a MAC PDU containing one or more SDUs from one or more logical channels based on the grant.

In some implementations, the wireless device may start a timer when the wireless device performs new transmission of the MAC PDU.

In some implementations, the grant may be include an uplink grant. The wireless device may autonomously create the uplink grant. Or, the wireless device may receive the uplink grant from the network.

In some implementations, if a cell, a carrier and/or a resource pool is associated with multiple logical channels, the logical channels may be mapped to the grant. If the wireless device autonomously allocates a grant for retransmission, the wireless device may choose the highest number among the maximum numbers of retransmissions and/or the configured timer values for those logical channels, and then select one or more grants based on the chosen maximum number of retransmissions and/or the configured timer values for those logical channels.

In step S1020, the wireless device chooses the highest number among the maximum numbers of retransmissions and/or the configured timer values for the logical channels and/or logical channel groups.

In step S1030, the wireless device transmits, to the network, a radio channel for transmission and/or retransmission of the MAC PDU. The wireless device may transmit, to the network, control information associated with the radio channel for the MAC PDU. The control information may include information for the chosen maximum number of retransmissions and/or the chosen timer value for the MAC PDU.

In step S1040, if (re-)transmission of the MAC PDU is not positively acknowledged, and/or if a grant is received for a retransmission, the wireless device performs a retransmission of the MAC PDU up to the chosen maximum number of retransmissions and/or until the timer runs up to the chosen timer value.

In some implementations, a value of the maximum number of retransmissions and/or a timer value for retransmissions for a logical channel and/or a logical channel group may be replaced by a value of the maximum number of retransmissions and/or a timer value for retransmissions for e.g., a service type, a priority, a QoS indicator and/or a destination. In this case, different service types, different priorities, different QoS indicators and/or different destinations can be configured with different values.

In some implementations, the priority may include at least one of a logical channel priority, PPPP and/or PPPR.

In some implementations, the QoS indicator may include at least one of QCI and/or 5QI.

Figure 11:
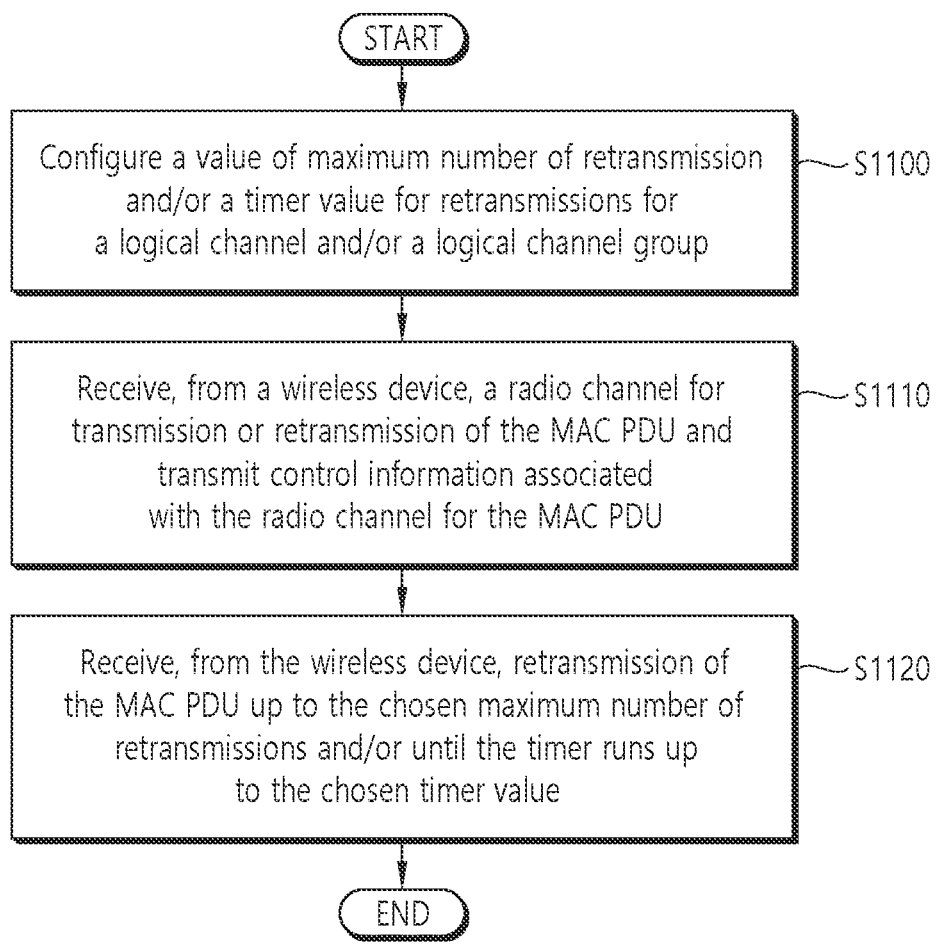
FIG. 11 shows an example of a method for performing data transmission by a base station to which the technical features of the present disclosure can be applied.

FIG. 11 shows an example of a method for performing data transmission by a base station to which the technical features of the present disclosure can be applied.

In step S1100, the BS configures a value of the maximum number of retransmissions and/or a timer value for retransmissions for a logical channel and/or logical channel group to a wireless device.

In some implementations, different logical channels may be configured with different values. For example, a first maximum number of retransmissions may be configured for a first logical channel and/or a first logical channel group, and a second maximum number of retransmissions may be configured for a second logical channel and/or a second logical channel group. For example, a first timer value for retransmissions may be configured for a first logical channel and/or a first logical channel group, and a second timer value for retransmissions may be configured for a second logical channel and/or a second logical channel group.

In step S1110, the BS receives, from the wireless device, a radio channel for transmission and/or retransmission of the MAC PDU. The BS may further receive, from the wireless device, control information associated with the radio channel for the MAC PDU. The control information may include information for the maximum number of retransmissions and/or the timer value for the MAC PDU, chosen by the wireless device based on the configured value of the maximum number of HARQ retransmissions and/or the timer value for retransmissions for each logical channel and/or each logical channel group.

In step S1120, the BS may receive, from the wireless device, retransmission of the MAC PDU up to the chosen maximum number of retransmissions and/or until the timer runs up to the chosen timer value.

In some implementations, a value of the maximum number of retransmissions and/or a timer value for retransmissions for a logical channel and/or a logical channel group may be replaced by a value of the maximum number of retransmissions and/or a timer value for retransmissions for e.g., a service type, a priority, a QoS indicator and/or a destination. In this case, different service types, different priorities, different QoS indicators and/or different destinations can be configured with different values.

In some implementations, the priority may include at least one of a logical channel priority, PPPP and/or PPPR.

In some implementations, the QoS indicator may include at least one of QCI and/or 5QI.

Figure 12:
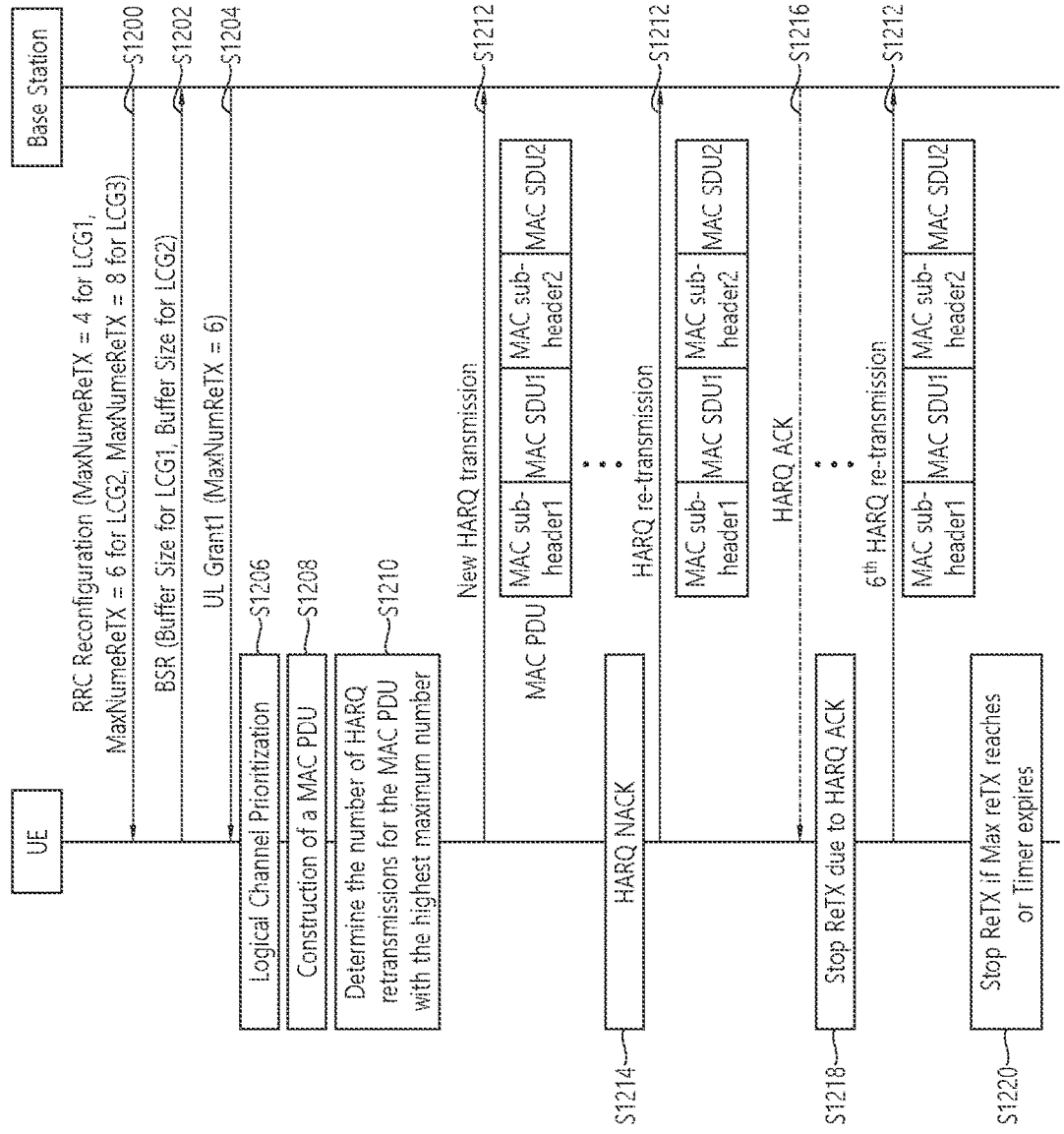
FIG. 12 shows an example of an uplink data transmission to which the technical features of the present disclosure can be applied.

FIG. 12 shows an example of an uplink data transmission to which the technical features of the present disclosure can be applied.

In step S1200, BS configures the maximum number of HARQ retransmissions and/or the timer value for retransmissions for each logical channel and/or each logical channel group for UE. Different logical channels and/or different logical channel groups can be configured with different maximum numbers of HARQ retransmissions and/or different timer values for retransmissions. BS transmits the configuration to UE. Upon receiving the configuration, UE applies the configuration to HARQ operation.

In this example, it is assumed that the maximum number of HARQ retransmission for a logical channel group 1 is 4, the maximum number of HARQ retransmission for a logical channel group 2 is 6, and the maximum number of HARQ retransmission for a logical channel group 3 is 8.

In some implementations, the maximum number of HARQ retransmissions and/or the timer value for retransmissions can be configured for e.g., a service type, a priority, a QoS indicator and/or a destination. In this case, different service types, different priorities, different QoS indicators and/or different destinations can be configured with different values. The priority may be include at least one of a logical channel priority, PPPP and/or PPPR. The QoS indicator may include at least one of QCI and/or 5QI. For example, the maximum number of HARQ retransmissions and/or the timer value for retransmissions can be configured for a logical channel priority or a 5QI.

In step S1202, UE may trigger a scheduling request (SR) to acquire uplink grant. If the uplink grant is received, UE may transmit buffer status report MAC control element (BSR MAC CE) based on the uplink grant to indicate buffer size for one or more logical channels and/or one or more logical channel groups.

In some implementations, UE may choose the highest number among the maximum numbers of retransmissions and/or the configured timer values for the logical channels and/or the logical channel groups that are indicated by the BSR MAC CE and/or have data available in L2 buffer (e.g., RLC/PDCP buffer of RLC entities that can use the same resource on the same cell on the same bandwidth part on the same carrier).

In some implementations, UE may additionally indicate at least one of the chosen maximum number of uplink grants for retransmissions, how many HARQ retransmissions UE wants to perform, and/or how long UE wants to perform HARQ retransmissions for each logical channel and/or each logical channel group, to BS via the BSR MAC CE or uplink control information (UCI).

In some implementations, the SL BSR MAC CE may further indicate at least one of a destination index or UE Index, a LCG, and/or a buffer size corresponding to the destination service, the destination group and/or the destination UE (e.g., another UE). The destination index may address the destination service, the destination group and/or the destination UE. The UE index may address the destination/receiving UE, e.g., another UE.

In this example, it is assumed that the BSR MAC CE includes a buffer size for the logical channel group 1 and a buffer size for the logical channel group 2.

In step S1204, upon receiving the BSR MAC CE from UE, BS can determine the number of uplink grants for retransmissions for a new HARQ transmission, how many HARQ retransmissions UE may perform and/or how long UE may perform HARQ retransmissions. BS creates an uplink grant for the new HARQ transmission. BS may create zero, or more uplink grants for retransmissions based on at least one of the number of HARQ retransmissions, how many HARQ retransmissions UE may perform, and/or how long UE may perform HARQ retransmissions. Then, BS transmits PDCCH to UE.

In some implementations, the PDCCH may indicate the uplink grant for new transmission and zero or more uplink grants for retransmissions. In this case, UE may use the uplink grant for new transmission of a MAC PDU and the other uplink grants for retransmissions of the MAC PDU.

In some implementations, the PDCCH may indicate an uplink grant and the number of HARQ retransmissions with a certain pattern (e.g., periodic and/or aperiodic allocation of the uplink grant with a regular and/or irregular interval.). In this case, UE may repeatedly use the uplink grant and/or the resource indicated by the uplink grant for new transmission and retransmissions of a MAC PDU based on the indicated pattern and the number of HARQ retransmissions.

In this example, it is assumed that BS determines the maximum number HARQ retransmission as 6, since UE reports the BSR MAC CE including a buffer size for the logical channel group 1 (i.e., corresponding maximum number of retransmission is 4) and a buffer size for the logical channel group 2 (corresponding maximum number of retransmissions is 6) in step S1202.

In step S1206, if UE receives the uplink grant from BS, UE performs logical channel prioritization. In step S1208, based on the logical channel prioritization, UE constructs a MAC PDU based on the uplink grant. In step S1210, UE determines the number of HARQ retransmissions for the MAC PDU with the highest maximum number of HARQ retransmission for each logical channel and/or each logical channel group.

In some implementations, UE may include one or more MAC SDUs from one or more logical channels into the MAC PDU based on the uplink grant and/or the number of HARQ retransmissions related to the uplink grant. For example, if the number of HARQ retransmissions and/or the timer value for retransmissions is indicated or associated with the uplink grant, UE may include one or more MAC SDUs only from the logical channel of which the configured number of HARQ retransmissions and/or the configured timer value is equal to or lower than the number of HARQ retransmissions supported by the uplink grants.

For example, if UE allocates or receives uplink grants for 6 retransmissions, UE may only consider logical channels of which the number of HARQ retransmissions is configured with 4 or 6 to perform logical channel prioritization. In this example, UE only considers logical channel group 1 and logical channel group 2 to create a MAC PDU to be transmitted and retransmitted based on the uplink grant.

In some implementations, UE may deliver the MAC PDU to a HARQ process with the uplink grant for new transmission and/or the uplink grants for retransmissions. The HARQ process may be associated with the number of HARQ retransmissions and/or the timer value for retransmissions. UE may flush HARQ buffer of the HARQ process after completing the number of retransmissions and/or the timer expires. In case of the timer, UE may start the timer when UE submits the MAC PDU to the physical layer or transmits the MAC PDU.

In step S1212, UE performs HARQ transmission and/or HARQ retransmissions. If a HARQ transmission and/or a retransmission is not positively acknowledged by BS in step S1214, UE may perform a HARQ retransmission of the MAC PDU from the HARQ process, if an uplink grant is available for this retransmission.

In some implementations, UE may consider HARQ retransmissions of the MAC PDU is completed and flushes the HARQ buffer, if one of the following conditions is met:
  when the number of maximum retransmissions of the MAC PDU was reached regardless of positive acknowledgement
  when a timer associated with the MAC PDU expires regardless of positive acknowledgement
  when a positive acknowledgement is received For example, in step S1216, the positive acknowledgement is received from BS. In this case, in step S1218, UE consider HARQ retransmissions of the MAC PDU is completed, and stops HARQ retransmission.

For example, in step S1212, a number of HARQ retransmission has reached the determined maximum number of HARQ retransmissions, e.g., 6. In this case, in step S1220, UE consider HARQ retransmissions of the MAC PDU is completed, and stops HARQ retransmission.

In some implementations, if the uplink grant for retransmission is not used due to completion of HARQ transmissions of the MAC PDU, UE may skip the uplink grant allocated for retransmission (e.g., when the HARQ buffer is empty). Alternatively, if another MAC PDU is delivered to the HARQ process, UE may use the uplink grant allocated retransmission for new transmission of another MAC PDU.

The present disclosure may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 13:
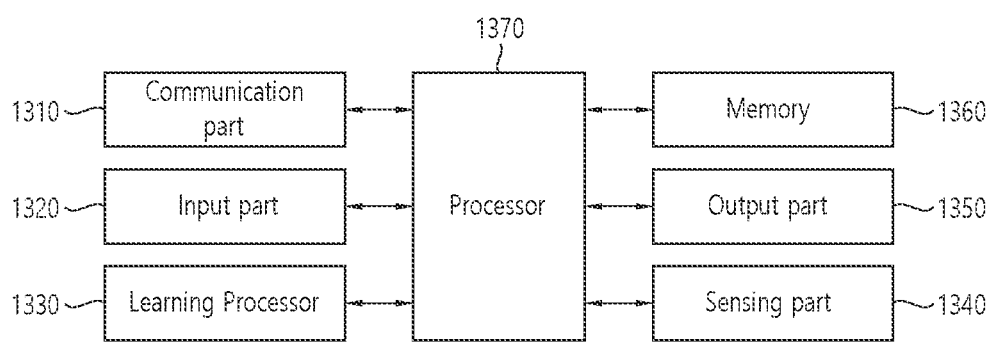
FIG. 13 shows an example of an AI device to which the technical features of the present disclosure can be applied.

FIG. 13 shows an example of an AI device to which the technical features of the present disclosure can be applied.

The AI device 1300 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 13, the AI device 1300 may include a communication part 1310, an input part 1320, a learning processor 1330, a sensing part 1340, an output part 1350, a memory 1360, and a processor 1370.

The communication part 1310 can transmit and/or receive data to and/or from external devices such as the AI devices and the AI server using wire and/or wireless communication technology. For example, the communication part 1310 can transmit and/or receive sensor information, a user input, a learning model, and a control signal with external devices. The communication technology used by the communication part 1310 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1320 can acquire various kinds of data. The input part 1320 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1320 can acquire input data to be used when acquiring an output using learning data and a learning model for model learning. The input part 1320 may obtain raw input data, in which case the processor 1370 or the learning processor 1330 may extract input features by preprocessing the input data.

The learning processor 1330 may learn a model composed of an ANN using learning data. The learned ANN can be referred to as a learning model. The learning model can be used to infer result values for new input data rather than learning data, and the inferred values can be used as a basis for determining which actions to perform. The learning processor 1330 may perform AI processing together with the learning processor of the AI server. The learning processor 1330 may include a memory integrated and/or implemented in the AI device 1300. Alternatively, the learning processor 1330 may be implemented using the memory 1360, an external memory directly coupled to the AI device 1300, and/or a memory maintained in an external device.

The sensing part 1340 may acquire at least one of internal information of the AI device 1300, environment information of the AI device 1300, and/or the user information using various sensors. The sensors included in the sensing part 1340 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1350 may generate an output related to visual, auditory, tactile, etc. The output part 1350 may include a display unit for outputting visual information, a speaker for outputting auditory information, and/or a haptic module for outputting tactile information.

The memory 1360 may store data that supports various functions of the AI device 1300. For example, the memory 1360 may store input data acquired by the input part 1320, learning data, a learning model, a learning history, etc.

The processor 1370 may determine at least one executable operation of the AI device 1300 based on information determined and/or generated using a data analysis algorithm and/or a machine learning algorithm. The processor 1370 may then control the components of the AI device 1300 to perform the determined operation. The processor 1370 may request, retrieve, receive, and/or utilize data in the learning processor 1330 and/or the memory 1360, and may control the components of the AI device 1300 to execute the predicted operation and/or the operation determined to be desirable among the at least one executable operation. The processor 1370 may generate a control signal for controlling the external device, and may transmit the generated control signal to the external device, when the external device needs to be linked to perform the determined operation. The processor 1370 may obtain the intention information for the user input and determine the user's requirements based on the obtained intention information. The processor 1370 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1330 and/or learned by the learning processor of the AI server, and/or learned by their distributed processing. The processor 1370 may collect history information including the operation contents of the AI device 1300 and/or the user's feedback on the operation, etc. The processor 1370 may store the collected history information in the memory 1360 and/or the learning processor 1330, and/or transmit to an external device such as the AI server. The collected history information can be used to update the learning model. The processor 1370 may control at least some of the components of AI device 1300 to drive an application program stored in memory 1360. Furthermore, the processor 1370 may operate two or more of the components included in the AI device 1300 in combination with each other for driving the application program.

Figure 14:
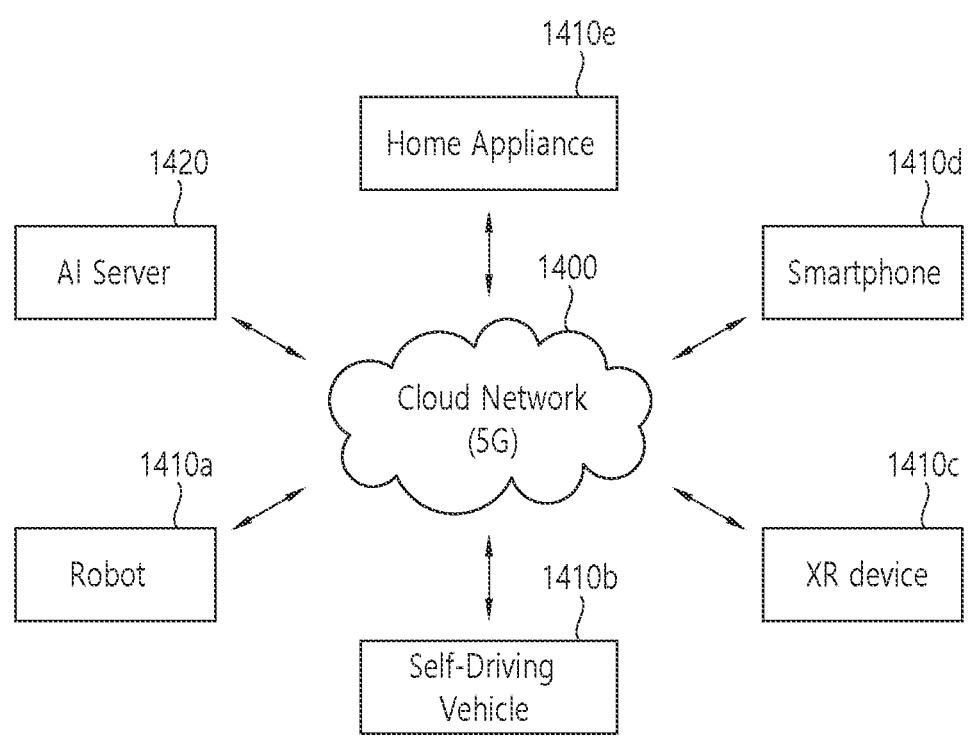
FIG. 14 shows an example of an AI system to which the technical features of the present disclosure can be applied.

FIG. 14 shows an example of an AI system to which the technical features of the present disclosure can be applied.

Referring to FIG. 14, in the AI system, at least one of an AI server 1420, a robot 1410a, an autonomous vehicle 1410b, an XR device 1410c, a smartphone 1410d and/or a home appliance 1410e is connected to a cloud network 1400. The robot 1410a, the autonomous vehicle 1410b, the XR device 1410c, the smartphone 1410d, and/or the home appliance 1410e to which the AI technology is applied may be referred to as AI devices 1410a to 1410e.

The cloud network 1400 may refer to a network that forms part of a cloud computing infrastructure and/or resides in a cloud computing infrastructure. The cloud network 1400 may be configured using a 3G network, a 4G or LTE network, and/or a 5G network. That is, each of the devices 1410a to 1410e and 1420 consisting the AI system may be connected to each other through the cloud network 1400. In particular, each of the devices 1410a to 1410e and 1420 may communicate with each other through a base station, but may directly communicate with each other without using a base station.

The AI server 1420 may include a server for performing AI processing and a server for performing operations on big data. The AI server 1420 is connected to at least one or more of AI devices constituting the AI system, i.e., the robot 1410a, the autonomous vehicle 1410b, the XR device 1410c, the smartphone 1410d and/or the home appliance 1410e through the cloud network 1400, and may assist at least some AI processing of the connected AI devices 1410a to 1410e. The AI server 1420 can learn the ANN according to the machine learning algorithm on behalf of the AI devices 1410a to 1410e, and can directly store the learning models and/or transmit them to the AI devices 1410a to 1410e. The AI server 1420 may receive the input data from the AI devices 1410a to 1410e, infer the result value with respect to the received input data using the learning model, generate a response and/or a control command based on the inferred result value, and transmit the generated data to the AI devices 1410*a* to 1410*e*. Alternatively, the AI devices 1410*a* to 1410*e* may directly infer a result value for the input data using a learning model, and generate a response and/or a control command based on the inferred result value.

Various embodiments of the AI devices 1410*a* to 1410*e* to which the technical features of the present disclosure can be applied will be described. The AI devices 1410*a* to 1410*e* shown in FIG. 14 can be seen as specific embodiments of the AI device 1300 shown in FIG. 13.

The present disclosure can have various advantageous effects.

A wireless device performing uplink HARQ transmission of a packet by using radio resources can dynamically and efficiently allocate resources for retransmissions of the packet by considering service characteristics and/or requirements, in particular when packets from various services are multiplexed into a single data unit.

The system can provide dynamic and efficient allocation of resources for data retransmissions for a wireless device performing uplink HARQ transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device adapted to operate in a wireless communication system, the method comprising:
receiving, from a network, information related to a first retransmission number for a first logical channel and a second retransmission number for a second logical channel;
receiving, from the network, information related to a first timer value for the first logical channel and a second timer value for the second logical channel;
determining a retransmission number of a data unit based on the first retransmission number and the second retransmission number;
determining a retransmission timer value based on the first timer value and the second timer value;
triggering a scheduling request (SR) to acquire an uplink grant;
transmitting, to the network, a buffer status report based on the uplink grant;
wherein the buffer status report includes i) a buffer size for one or more of the first logical channel or the second logical channel, ii) information related to the retransmission number of the data unit, and iii) information related to a maximum number of grants for retransmission;
receiving, from the network, one or more grants which are created by a base station based on the retransmission number of the data unit and the maximum number of grants for retransmission;
performing logical channel prioritization to construct the data unit;
performing an initial transmission of the data unit;
starting a timer; and
performing retransmission of the data unit up to the maximum retransmission number until the timer expires based on the retransmission timer value.

2. The method of claim 1, wherein the retransmission number of the data unit is a highest number among the first retransmission number and the second retransmission number.

3. The method of claim 1,
wherein the retransmission timer value is a highest timer value among the first timer value and the second timer value.

4. The method of claim 1, wherein the buffer status report further includes information related to the retransmission timer value.

5. The method of claim 1, wherein the first logical channel belongs to a first logical channel group, and
wherein the second logical channel belongs to a second logical channel group.

6. The method of claim 1, wherein the data unit includes a media access control (MAC) protocol data unit (PDU), and
wherein the MAC PDU includes one or more MAC service data units (SDUs) from the first logical channel and the second logical channel.

7. The method of claim 1, wherein the data unit is constructed based on the one or more grants.

8. The method of claim 1, wherein the wireless device is in communication with at least one of a mobile device, a network, and/or autonomous vehicles other than the wireless device.

9. A wireless device adapted to operate in a wireless communication system, comprising:
at least one transceiver;
at least one processor; and
at least one computer memory operably connectable to the at least one processor and storing instructions that, based on being executed by the at least one processor, perform operations comprising:
receiving, from a network, information related to a first retransmission number for a first logical channel and a second retransmission number for a second logical channel;
receiving, from the network, information related to a first timer value for the first logical channel and a second timer value for the second logical channel;
determining a retransmission number of a data unit based on the first retransmission number and the second retransmission number;
determining a retransmission timer value based on the first timer value and the second timer value;
triggering a scheduling request (SR) to acquire an uplink grant;
transmitting, to the network, a buffer status report based on the uplink grant,
wherein the buffer status report includes i) a buffer size for one or more of the first logical channel or the second logical channel, ii) information related to the retransmission number of the data unit, and iii) information related to a maximum number of grants for retransmission;

receiving, from the network, one or more grants which are created by a base station based on the retransmission number of the data unit and the maximum number of grants for retransmission;

performing logical channel prioritization to construct the data unit;

performing an initial transmission of the data unit;

starting a timer; and performing retransmission of the data unit up to the maximum retransmission number until the timer expires based on the retransmission timer value.

* * * * *